US012646968B2

(12) United States Patent (10) Patent No.: US 12,646,968 B2
Luvisotto et al. (45) Date of Patent: Jun. 2, 2026

(54) METHOD FOR ESTABLISHING A WIRELESS COMMUNICATION SYSTEM IN A HIGH-VOLTAGE POWER CONVERTER STATION AND A HIGH-VOLTAGE POWER CONVERTER STATION

(71) Applicant: Hitachi Energy Ltd, Zürich (CH)

(72) Inventors: Michele Luvisotto, Västerås (SE);
Daniel Hallmans, Ludvika (SE);
Christer Sjöberg, Ludvika (SE);
Jimmy Ohman, Ludvika (SE)

(73) Assignee: HITACHI ENERGY LTD, Zürich
(CH)

( * ) Notice: Subject to any disclaimer, the term of this patent is extended or adjusted under 35 U.S.C. 154(b) by 692 days.

(21) Appl. No.: 18/029,803

(22) PCT Filed: Apr. 14, 2021

(86) PCT No.: PCT/EP2021/059612
§ 371 (c)(1),
(2) Date: Mar. 31, 2023

(87) PCT Pub. No.: WO2022/218518
PCT Pub. Date: Oct. 20, 2022

(65) Prior Publication Data
US 2023/0361596 A1 Nov. 9, 2023

(51) Int. Cl.
*H02J 3/36* (2026.01)
*H02J 13/13* (2026.01)
*H04W 40/00* (2009.01)
(52) U.S. Cl.
CPC ............ *H02J 13/1331* (2026.01); *H02J 3/36* (2013.01); *H04W 40/005* (2013.01)

(58) Field of Classification Search
CPC .... H02J 13/00022; H02J 3/36; H04W 40/005
See application file for complete search history.

(56) References Cited

U.S. PATENT DOCUMENTS

2017/0028853 A1    2/2017  Elshaer et al.
2017/0244471 A1*   8/2017  Nagakubo ........... H04W 40/005
(Continued)

FOREIGN PATENT DOCUMENTS

CN          104954027 A      9/2015
CN          105375648 A      3/2016
(Continued)

*Primary Examiner* — Robert Grant
(74) *Attorney, Agent, or Firm* — PROCOPIO, CORY, HARGREAVES & SAVITCH LLP

(57) ABSTRACT

A method for establishing a wireless communication system in a high-voltage power converter station is provided. The high-voltage power converter station includes a plurality of power devices. The wireless communication system includes a plurality of wireless communication devices, some of which are associated with a power device such that a power device and a wireless communication device together form a wireless power electronic module. The high-voltage power converter station further comprises at least one wireless networking device for providing a communication interface between the plurality of wireless communication devices and a controller configured to control the power devices. The controller determines at least one communication path providing a signal quality above a threshold based on indications of signal quality for a plurality of channels established either between a wireless networking device and a wireless power electronic module or between a wireless communication device and a wireless power electronic module.

20 Claims, 5 Drawing Sheets

(56)                    References Cited

U.S. PATENT DOCUMENTS

| | | | |
|---|---|---|---|
| 2019/0288766 | A1 | 9/2019 | Ng et al. |
| 2020/0091964 | A1 | 3/2020 | Zhibo et al. |
| 2020/0337116 | A1* | 10/2020 | Almodovar Chico ...................... H04W 76/14 |

FOREIGN PATENT DOCUMENTS

| | | | |
|---|---|---|---|
| CN | 105659486 | A | 6/2016 |
| CN | 107534458 | A | 1/2018 |
| CN | 110581535 | A | 12/2019 |
| EP | 3242372 | A1 | 11/2017 |
| EP | 3474096 | A1 | 4/2019 |
| GB | 1494099 | A | 12/1977 |
| KR | 10-2017-0124244 | A | 11/2017 |

* cited by examiner

METHOD FOR ESTABLISHING A WIRELESS COMMUNICATION SYSTEM IN A HIGH-VOLTAGE POWER CONVERTER STATION AND A HIGH-VOLTAGE POWER CONVERTER STATION

CROSS-REFERENCE TO RELATED APPLICATIONS

The present application is a national stage entry of International Patent Application No. PCT/EP2021/059612, filed on Apr. 14, 2021, which is hereby incorporated herein by reference as if set forth in full.

TECHNICAL FIELD

The present disclosure relates to wireless communication in a high-voltage power converter station and, in particular, to the establishment of a wireless communication system in a high-voltage power converter station.

BACKGROUND

High-voltage power converter stations employed in for example high-voltage direct current, HVDC, electric power transmission systems often rely on optical links to control switching of their high-voltage power converters and, more generally, power devices, such as for example insulated-gate bipolar transistors, IGBTs, and/or thyristors.

Optical links provide reliable and high-speed communication while maintaining the required voltage insulation. However, installation and commissioning of optical links are time-consuming and costly.

High-voltage power converter control requires both ultra-low latency and ultra-reliable communication to a plurality of power devices. Traditional wireless communication systems deployed in the 2.4/5 GHz spectrum or neighbouring frequencies, such as, for example, WiFi, LTE, Bluetooth, suffer from limited available bandwidth, which constrains the achievable latency.

Further, the presence of metallic obstacles, such as, for example, electromagnetic interference (EMI) shields, cooling pipes, and/or supporting structures, in a power converter station may limit propagation of radio signals between controllers and power devices. The reliability of traditional wireless communication could be improved by signal processing methods, such as forward-error correction and/or retransmissions. However, such signal processing methods increase the latency of the communication. Furthermore, the traditional wireless communication could be impaired and/or limited by interference caused by radio signals external to the power converter station, such as, for example, cellular networks and/or satellite links, which could limit the available bandwidth and/or reduce the reliability of the traditional communication system.

SUMMARY

An object of the present disclosure is to provide a reliable, low latency and high-speed communication system for a power converter station. An additional object of the present disclosure is to provide a more easily installable and commissionable communication system in a power converter station. To achieve at least one of these objects and other objects, a method for establishing a wireless communication system in a high-voltage power converter station and a high-voltage power converter station in accordance with the independent claims are provided. Preferred embodiments are defined by the dependent claims.

According to a first aspect, a method for establishing a wireless communication system in a high-voltage power converter station is provided. The high-voltage power converter station includes a plurality of power devices and the wireless communication system includes a plurality of wireless communication devices. Some of the wireless communication devices are associated with a power device such that a power device and a wireless communication device together form a wireless power electronic module. The wireless communication system includes also at least one wireless networking device for providing a communication interface between the plurality of wireless communication devices and a controller configured to control the power devices.

The method comprises obtaining, at the controller, an indication of signal quality for each one of a plurality of first channels. A first channel corresponds to a communication path between one of the at least one wireless networking device and a wireless communication device of the plurality of wireless communication devices using one of a plurality of radio beam directions. The method further comprises obtaining, at the controller, an indication of signal quality for each one of a plurality of second channels. A second channel corresponds to a communication path between a wireless communication device and a wireless power electronic module of the plurality of wireless power electronic modules using one of a plurality of radio beam directions. The method further comprises determining, by the controller, for every wireless power electronic module, at least one communication path from the controller to the wireless power electronic module based on the indications of signal quality obtained for the plurality of first channels and the plurality of second channels. The determined communication path provides a signal quality above a threshold.

According to a second aspect, a high-voltage power converter station is provided. The high-voltage power converter station comprises a plurality of power devices. The high-voltage power converter station further comprises a plurality of wireless communication devices. Some of the plurality of wireless communication devices are associated with a power device such that a power device and a wireless communication device together form a wireless power electronic module. The high-voltage power converter station further comprises at least one wireless networking device for providing a communication interface between the plurality of wireless communication devices and a controller. The controller is configured to control the power devices. The controller is further configured to obtain an indication of signal quality for each one of a plurality of first channels. A first channel corresponds to a communication path between one of the at least one wireless networking device and a wireless communication device of the plurality of wireless communication devices using one of a plurality of radio beam directions. The controller is further configured to obtain an indication of signal quality for each one of a plurality of second channels. A second channel corresponds to a communication path between a wireless communication device and a wireless power electronic module of the plurality of wireless power electronic modules using one of a plurality of radio beam directions. The controller is further configured to determine, for every wireless power electronic module, at least one communication path from the controller to the wireless power electronic module based on the indications of signal quality obtained for the plurality of first channels and the plurality of second channels. The determined communication path provides a signal quality above a threshold.

The wireless communication system with the plurality of communication devices and the at least one networking device may be an integral part of the high-voltage power converter station. A power converter station or high-voltage power converter station may for example include a power converter hall, a power converter cabinet, a power converter substation or any other type of power converter stations including a plurality of (high-voltage) power devices. In this respect, a power device may for example include a switching device, such as an IGBT or a thyristor, a switch gear, or any other power device of the high-voltage power converter station under the control of the controller.

By the term "wireless communication device", it is meant, for example, a radio communication device, a microwave communication device, or millimeter-wave communication device. As mentioned above, a wireless communication device may be associated with a power device to form a wireless power electronic module in which the wireless communication device may receive control messages from a controller of the power converter station and may transmit status message to the controller. A wireless communication device which is not associated with a power device may be understood as, for example, a relay, or a relaying device.

Further, a wireless networking device may include any device acting as, for example, a wireless interface between the controller and the wireless communication devices. The wireless networking device may also be referred to as a wireless hub. The wireless networking device may be connected to the controller via a wire connection while it is configured to communicate wirelessly with the wireless communication devices.

Further, although reference is made to "a controller" when describing the method and the power converter station in the present disclosure, it will be appreciated that the power converter station may include a plurality of controllers. For example, each of the controllers may be configured to control a subset of the power devices of the power converter station. The controller may also be referred to as a control unit or control entity.

In the above, the indications of signal quality may for example include a value, a note, a message, or an index. The indications may be obtained via, for example, channel sounding.

Based on the indications of signal quality for the plurality of first channels and second channels, at least one communication path from the controller to the wireless power electronic module may be determined. This "determining" may be understood as, for example, a path selection.

The present method and high-voltage power converter station provide more reliable communications than a traditional wireless communication system. Furthermore, the time required for installation and commissioning of the communication system is decreased in comparison to the time required for the installation of a wired communication system. In other words, the benefits of the method and the high-voltage power converter station include a less time-consuming and costly installation and commissioning of the communication system used for control of the power devices of the power converter station.

It will also be appreciated that, in the present method and power converter station, the at least one communication path from the controller to a wireless power electronic module selected (or determined) by the controller may include a first channel and/or a second channel as long as the signal quality provided by the communication path is above a threshold. The selected communication path may include a communication between the controller and a networking device (or hub), which may be wired, and a wireless communication between other entities, such as a direct wireless communication between the networking device and the wireless power electronic module, which corresponds to one of the first channels, or an indirect (or relayed) wireless communication from the networking device to the wireless power electronic module via a wireless communication device acting as a relay, thereby including both one of the first channels (between the networking device and the wireless communication device) and one of the second channels (between the wireless communication device and the wireless power electronic module).

The present method and power converter station are therefore beneficial in that they may involve a combination of direct communication and cooperative communication (or communication based on relaying). The determination or selection of the communication path for a certain wireless power electronic module will depend on the location of the wireless power electronic module within the power converter station as a direct wireless communication between a wireless networking device and the wireless power electronic module may not result in a signal quality above the threshold while a relayed communication via one of the wireless communication devices between the networking device and the wireless power electronic module may provide a signal quality above the threshold.

The present method and power converter station combine directional communication, by selecting at least one communication path from a plurality of radio beam directions for the first channel and/or the second channel, and cooperative communication. A combination of directional communication and cooperative communication may result in a greater number of possible communication paths, which may result in more communication paths having a signal quality above a predetermined threshold (available communication paths). This provides redundancy for communication between the controller and a wireless power electronic module, thereby resulting in a more reliable communication system and thus a more reliable power converter station.

In the present method and power converter station, a plurality of communication paths is investigated in that the quality of a plurality of combinations for establishing a communication path from the controller to each one of the wireless power electronic modules is compared with a threshold. These combinations include one or more of the plurality of first channels and the plurality of second channels, as described above. Further, this determination may only require the measurement of the quality of the wireless links for the plausible communication paths, which include the first channels and the second channels.

The controller may be configured to communicate with a wireless power electronic module along at least two communication paths providing the two highest signal qualities. In other words, the controller may determine at least two communication paths from the controller to the wireless power electronic module based on the indications of signal quality obtained for the plurality of first channels and the plurality of second channels. The determined communication paths may provide a signal quality above a threshold. The present embodiment is advantageous in that it provides redundancy for communication between the controller and a wireless power electronic module, thereby resulting in a more reliable communication system and thus a more reliable power converter station.

5

The controller may be configured to prioritize the determined communication paths with respect to signal quality. By the term "prioritize", it is further meant, for example, rank, list, rate, or score. The controller may be configured to prioritize the determined communication paths with respect to the indications of signal quality. The present embodiment is beneficial in that it may provide a ranked list of communication paths, thereby increasing the reliability of the communication system and, thus, the reliability of the power converter station.

Information about the at least one determined communication path may be transmitted to the at least one wireless networking device and the wireless communication devices. The information may be transmitted from the controller to the at least one wireless networking device, which may then transmit or forward the information to the wireless communication devices (thereby also reaching the wireless power electronic modules). The information about the at least one determined communication path may comprise the at least one determined path between every wireless networking device and every wireless communication device or information about the complete communication path from the controller to every wireless power electronic module. In case there is a plurality of wireless networking devices, the information about the at least one determined communication path sent to a specific wireless networking device may comprise information about the at least one determined path involving this specific wireless networking device. Similarly, the information about the at least one determined communication path sent to a respective wireless communication device may comprise only information about the at least one determined path for the respective wireless communication device. Distributing the information about the determined (or preferred) communication paths between the controller and the wireless power electronic modules improves the response time in establishment of the wireless communication system within the power converter station.

The controller may be configured to, during operation, communicate with every wireless power module along a communication path providing the highest signal quality. The controller may be further configured to determine that the communication path is inactive if a status message is not received from the wireless power module within a predetermined time period. Upon such a determination, the controller may be configured to switch to a communication path providing the second highest signal quality. In other words, the controller may be further configured to, upon the determination, switch to an active communication path providing the highest signal quality. The wireless power electronic module may be configured to transmit the status message to the controller. The wireless power module may be configured to transmit the status message to the controller repeatedly, wherein the time between transmission of status messages may be referred to as a status time period. The predetermined time period may be equal to the status time period times a predetermined number. In other words, the controller may be configured to determine that the communication path is inactive if a status message is not received from the power module with a time equal to the status time period times the predetermined number). By the term "predetermined number", it is meant, for example, substantially any whole number. In other words, the controller may be configured to determine that the communication path is inactive if the controller has not received a predetermined number of consecutive status messages. Accordingly, reliability is further increased in that the communication path(s) for communication between the controller and a wireless power electronic module is updated. Inactive communication paths are discarded and the prioritization between the active or available communication paths is updated.

Obtaining an indication of signal quality for a first channel of the plurality of first channels (i.e. for a channel between a wireless networking device and a wireless communication device along a certain beam direction) may include transmitting a first sounding message from the wireless networking device to the wireless communication device, receiving, at the wireless networking device, a message from the wireless communication device in response to the first sounding message and transmitting, from the wireless networking device to the controller, information about signal quality of the first channel based on the message received in response to the first sounding message. In other words, the indications of signal quality for the plurality of first channels, i.e. for different combinations of networking devices and wireless communication devices and for different beam directions, may be based on channel sounding.

Obtaining an indication of signal quality for a second channel of the plurality of second channels (i.e. for a channel between a wireless communication device and a wireless electronic power module along a certain beam direction) may include forwarding, from the wireless communication device to the wireless power electronic module, a second sounding message received at the wireless communication device from a wireless networking device of the at least one wireless networking device. The present embodiment may then further include receiving, at the communication device, a message from the wireless power electronic module in response to the second sounding message and transmitting, from the wireless communication device to the controller via the wireless networking device, information about signal quality of the second channel based on the message received in response to the second sounding message. In other words, the indications of signal quality for the plurality of second channels, i.e. for different combinations of communication devices and wireless power electronic modules and for different beam directions, may be based on channel sounding.

A wireless networking device and a wireless communication device may each include an antenna element for directing their respective radio beams. A radio beam direction may be established by a setting of the antenna element of the wireless networking device and a setting of the antenna element of the wireless communication device.

Similarly, each one of the plurality of wireless communication devices may include an antenna element for directing their respective radio beams and a radio beam direction between two wireless communication devices for, for example, obtaining an indication of quality of a second channel may be established by a setting of the antenna element of the wireless communication device and a setting of the antenna element of the wireless communication device of the wireless power electronic module.

An antenna element may be configured to direct its respective radio beams with an accuracy of a number of degrees. Thereby, the number of possible radio beam directions of the antenna element is 360 degrees divided by its respective accuracy. For example, if an antenna element has an accuracy of 10 degrees, then that antenna element may direct its radio beams in 36 (i.e. 360 divided by 10) directions. It is to be understood that the mentioned accuracy is purely exemplary. The accuracy of an antenna element may be, substantially, any number of degrees. The antenna element may comprise an analog board including at least one antenna. By the term "antenna element", it is further meant, for example, antenna array, directional antenna. The antenna element may be coupled to its respective wireless networking device or respective wireless communication device.

A wireless communication device may include at least two antenna elements for directing the respective radio beams. A wireless communication device including at least two antenna elements may be configured to receive radio signals via at least one first antenna element of the at least two antenna elements and to transmit radio signals via at least one second antenna element of the at least two antenna elements. The at least two antenna elements of a wireless communication device may be coupled to each other. The at least one second antenna element of a wireless communication device may be configured to forward a signal or message received by the at least one first antenna element of the wireless communication device. The forwarding of the signal or message may be done in the analog domain, which may reduce latency. At least one of the frequencies and radio beam directions of the at least one first antenna element and the at least one second antenna element of a wireless communication device may be different such that interference between the at least one first antenna element and the at least one second antenna element may be reduced. The use of two antenna elements increases efficiency in establishing the communication system.

The radio beam direction may be established by beamforming or by manual setting of the respective antenna elements of the wireless networking device and/or the wireless communication device. Beamforming and manual setting may each be understood as directional communication. By the term "beamforming", it is further meant, for example, beam-steering. Beamforming may comprise applying a weight to each antenna in an antenna array of a respective antenna element. The application of a respective weight to each antenna in an antenna array of a respective antenna element may change the phase of the antenna. The change of phase of the antenna may direct a radio beam produced by the antenna array comprising the antenna in a specific direction. The wireless networking device and the wireless communication including an antenna element may be further configured to control the weights. The wireless networking device and the wireless communication including an antenna element may be further configured to control a frequency of signals transmitted by the respective antenna element. Beamforming may decrease the time it takes to switch between different radio beam directions, which reduces the installation and commissioning time in establishing the communication system of the power converter station. By the term "manual setting" it is further meant, for example, mechanical setting, manual directing, manual direction and/or mechanical direction. The manual setting may be performed by a motor configured to rotate the antenna element. The manual setting may alternatively be performed by an operator manually directing the antenna element. The present embodiment allows for a greater plurality of possible radio beam directions, which may reduce the latency and/or increase the bandwidth of the communication system.

The plurality of first channels may include all communication paths between every one of the at least one wireless networking device and every one of the plurality of wireless communication devices. Hence, the method may comprise obtaining an indication of signal quality for all communication paths between every one of the at least one wireless networking device and every one of the plurality of wireless communication devices. The present embodiment provides an indication of signal quality for every possible first channel within the power converter station, which may increase the number of communication paths providing a signal quality above a threshold, thereby increasing the bandwidth and/or reducing the latency of the communication system.

The at least one determined communication path between the controller and a wireless power electronic module may include at least one of a direct communication path between a wireless networking device and the wireless power electronic module and a communication path including a wireless communication device acting as a relay between a wireless networking device and the wireless power electronic module. In other words, the at least one determined communication path between the controller and a wireless power electronic module may include at least one of a direct communication path including a first channel and a communication path including a first channel and a second channel. In a communication path including a first channel and a second channel, a wireless communication device may act as a relay between the first channel and the second channel.

The controller may be configured to determine that a wireless power electronic module is faulty if it is determined that there is no communication path from the controller to the wireless power electronic module that provides a signal quality above the threshold. Expressed differently, a wireless power electronic module is determined as faulty if all communication paths from the controller to the wireless power electronic module provide a signal quality below the threshold. By the term "faulty", it is further meant, for example, inactive, unavailable, or malfunctioning. The controller may be configured to control the power devices of wireless power electronic modules, which are not determined to be faulty. The present embodiment reduces the risk of sending instructions from the controller to a faulty wireless power electronic module. The controller may be configured to control power devices to perform operations previously performed by a power device of a faulty wireless power electronic module.

The controller may be configured to determine that a wireless communication device is faulty if it is determined that there is no communication path from the controller to the wireless communication device that provides a signal quality above the threshold. The controller may be configured to, upon a determination that a wireless communication device is faulty, delete or cancel all determined communication paths to and from the faulty wireless communication device. If the faulty wireless communication device was acting as a relay for a wireless power electronic module, then the controller may switch to another determined communication path not involving the faulty wireless communication device in order to control the wireless power electronic module. The present embodiment further increases the reliability of the communication system.

The controller may be configured to communicate a respective communication frequency to every wireless networking device and to every wireless power electronic module. Every wireless networking device and every wireless power electronic module may be configured to communicate at their respective communication frequency.

Communication within the wireless communication system and therefore within the converter station, i.e. wireless communication between the wireless communication devices, the networking device(s) and/or the wireless power electronic modules, may correspond to communication at frequencies from 3 GHz to 300 GHz or from 0.1 THz to 10 THz. Communication may correspond to communication at frequencies from 30 GHz to 300 GHz or from 0.1 THz to 10 THz. In other words, wireless communication may correspond to millimeter wave (mmwave) range communication, sub-THz range communication, or THz range communication. Wireless communication at frequencies from 30 GHz to 300 GHz or from 0.1 THz to 10 THz has a shorter range than traditional wireless communication, such as communication at the 2.4/5 GHz spectrum or neighboring frequencies. The shorter range of communication at frequencies from 30 GHz to 300 GHz or from 0.1 THz to 10 THz may cause less interference between different communication channels using the frequencies. The reliability and the bandwidth may therefore be further increased by the use of such frequencies. Further, the use of such frequency ranges may allow different communication channels to use different (separate) frequencies within the frequency ranges, which may further increase the reliability and the bandwidth of the resulting method and power converter station.

It is noted that other embodiments using all possible combinations of features recited in the above described embodiments may be envisaged. Thus, the present disclosure also relates to all possible combinations of features mentioned herein.

BRIEF DESCRIPTION OF THE DRAWINGS

Exemplifying embodiments of the invention will be described below with reference to the accompanying drawings.

All the figures are schematic, not necessarily to scale, and generally only show parts which are necessary in order to elucidate embodiments of the present invention, wherein other parts may be omitted or merely suggested. Like reference numerals refer to like elements throughout.

DETAILED DESCRIPTION

Figure 1:
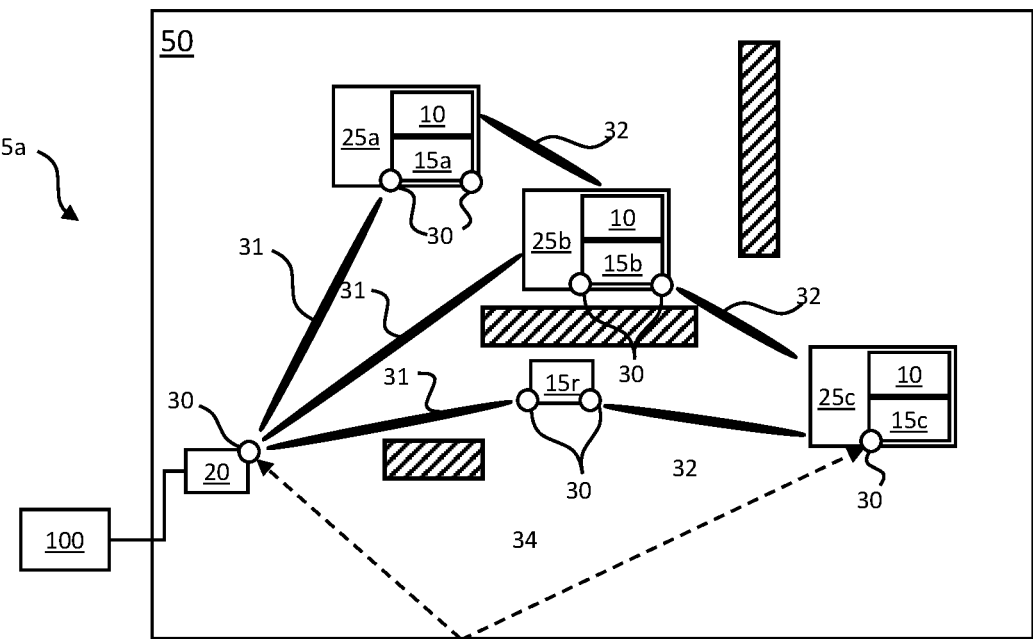
FIGS. 1 to 3 are schematic views of power converter stations according to one or more exemplifying embodiments.

The present invention will now be described hereinafter with reference to the accompanying drawings, in which exemplifying embodiments are shown. The present inventive concept may, however, be embodied in many different forms and should not be construed as limited to the embodiments set forth herein; rather, these embodiments are provided by way of example so that this disclosure will convey the scope of the invention to those skilled in the art. In the drawings, identical reference numerals denote the same or similar components having a same or similar function, unless specifically stated otherwise.

FIG. 1 is a schematic view of a converter station 5a according to one or more exemplifying embodiments. The converter station 5a may be a high-voltage power converter station 5a. The converter station 5a comprises a hall 50 or cabinet 50 in which three power devices 10 and four wireless communication devices 15a-15c, 15r are arranged. The wireless communication devices 15a-15c, 15r each comprises an antenna element 30, wherein three of the wireless communication devices 15a, 15b, 15r each comprises two antenna elements 30. The wireless communication devices 15a-15c, 15r are configured to receive radio signals via the antenna element(s) 30 and to transmit radio signals via the antenna element(s) 30. The three wireless communication devices 15a, 15b, 15r, which comprise two antenna elements 30, may be configured to simultaneously receive radio signals via one of the two antenna elements 30 and to transmit radio signals via the other one of the two antenna elements 30. Three of the four wireless communication devices 15a-15c are associated with a respective power device 10 such that a (i.e. one) power device 10 and a (i.e. one) wireless communication device 15a-15c together form a (i.e. one) wireless power electronic module 25a, 25b or 25c. The wireless communication device 15r which is not associated with a power device 10 may for example, be referred to (or act) as a relay 15r. The converter station 5a comprises also a wireless networking device 20 which is configured for providing a communication interface between the communication devices 15a-15c, 15r and a controller 100 configured to control the power devices 10 of the wireless power electronic modules 25a-25c. The networking device 20 comprises an antenna element 30. The wireless networking device 20 is configured to receive radio signals via the antenna element 30 and to transmit radio signals via the antenna element 30. The wireless networking device 20 is coupled to the controller 100. The wireless networking device 20 may be communicatively coupled to the controller 100 via a wire or wirelessly. Inside the converter station 5a depicted in FIG. 1, three obstacles are represented as hatched rectangles. The obstacles may for example be a wall, a doorway, a structural part of the converter station 5a, a piece of equipment, or furniture. The obstacles may cause interference or impairment in the communication between the wireless communication devices 15a-15c, 15r themselves and between the networking device 20 and the wireless communication devices 15a-15c, 15r. The obstacles may block, reflect and/or absorb radio signals.

Although the controller 100 is represented to be arranged outside of the power converter hall 50 in FIG. 1, the controller 100 may be, in other variants, arranged inside the converter station hall 50. Further, there may be additional controllers coupled to the wireless networking device 20. The additional controllers may be coupled to the wireless networking device 20 for redundancy, which may increase the reliability.

The wireless communication devices 15a-15c, 15r, the networking device 20 and the controller 100 may together constitute a communication system of the power converter station 5. The present disclosure relates to the establishment of this communication system and, in particular, in the establishment of communication paths between the controller 100 and every wireless power electronic modules 25a-25c such that they can exchange different types of messages such as control messages and status messages.

For this purpose, the controller 100 is configured to obtain an indication of signal quality for each one of a plurality of first channels 31. A first channel 31 corresponds to a communication path between the wireless networking device 20 and a wireless communication device 15a-15c of the four wireless communication devices 15a-15c using one of a plurality of radio beam directions (not shown in FIG. 1 but in FIG. 4). In other words, a first channel does not represent the complete communication path from the controller 100 to a communication device 15a-15c, 15r but the direct communication path from the networking device 20 to a communication device 15a-15c, 15r (i.e. a segment or section of the complete communication path).

The controller 100 is further configured to obtain an indication of signal quality for each one of a plurality of second channels 32. A second channel 32 corresponds to a communication path between a wireless communication device 15a-15c, 15r and a wireless power electronic module of the three wireless power electronic modules 25a, 25b, 25c using one of a plurality of radio beam directions. A second channel may therefore be a communication path between the wireless communication device 15a of the wireless power electronic module 25a to the wireless communication device 15b of the wireless power electronic module 25b or a communication path between the wireless communication device 15r not associated with any power device to one of the wireless power electronic modules 25a-25c. As for the first channels, a second channel does not represent the complete communication path from the controller 100 to a communication device 15 but the communication path from a communication device 15 to a wireless power electronic module (i.e. a segment or section of the complete communication path).

The controller 100 is then further configured to determine (or select), for every wireless power electronic module 25a, 25b, 25c, at least one communication path from the controller 100 to the wireless power electronic module 25a-25c based on the indications of signal quality obtained for the plurality of first channels 31 and the plurality of second channels 32 such that the determined or selected communication path provides a signal quality above a threshold.

For exemplary purpose, FIG. 1 shows three first channels 31. Each of the three first channels 31 corresponds to a communication path between the wireless networking device 20 and a respective wireless communication device 15a, 15b, 15r, wherein two of the three wireless communication devices 15a, 15b form a wireless power electronic module 25a, 25b together with a respective power device 10. These communication paths represent potential or candidate communication paths between the networking device 20 and the respective wireless electronic power modules 25a and 25b.

There may be a plurality of first channels 31 between the wireless networking device 20 and each wireless communication device 15a-15c, 15r. The three first channels 31 represented in FIG. 1 may be assumed to be determined communication paths which provide signal qualities above the threshold. The three first channels 31 represent direct communication paths. Further, it is to be understood that there may be a plurality of determined communication paths which provide signal qualities above the threshold between the wireless networking device 20 and each wireless communication device 15a-15c, 15r. The three determined communication paths 31 may be understood as the determined channels having the highest signal quality or, at least, having signal quality above the threshold.

FIG. 1 shows three second channels 32. One of the three second channels 32 is between the relay 15r and a wireless power electronic module 25c, and another of the three second channels 32 is between the wireless power electronic module 25c and another wireless power electronic module 25b. These two second channels may therefore provide two alternative communication paths from the controller 100 to the wireless power electronic module 25c, either via the relay 15r or via the wireless power electronic module 25b. This redundancy in communication paths is beneficial in case of equipment failure. For example, even if one of the wireless power electric module 25b or the relay 15r experiences an equipment failure, which would render one of the communication paths between the controller 100 and the wireless power electronic module 25c via the wireless power electric module 25b or the relay 15r, respectively, unusable, the wireless power module 25c would still have one communication path which provides signal quality above the threshold. In some examples, in order to further increase reliability of the system, it may also be envisaged that wireless communication between the networking device 20 and the wireless power electronic module 25c is established via the wireless communication device 25a and the wireless communication device 25b, thereby involving one first channel 31 and two second channels 32.

The three second channels 32 represented in FIG. 1 may be assumed to be at least a part of three determined communication paths between the controller 100 and one of the wireless power electronic module 25a-25c, which provide signal quality above the threshold.

The third of the three second channels 32 is between the wireless power electronic module 25a and the wireless power electronic module 25b. Thereby, the controller 100 may determine two communication paths between the wireless networking module 25b and the controller 100. One of the two determined communication paths may include the first channel 31 between the wireless networking device 20 and the wireless networking module 25b (a direct communication path). The other of the two determined communication paths comprises a first part which corresponds to the first channel 31 between the wireless networking device 20 and the wireless power electronic module 25a, and a second part which corresponds to the second channel 32 between the wireless power electronic module 25a and the wireless power electronic module 25b (a communication path based on cooperative communication). Both of the two determined communication paths may provide a signal quality above the threshold and, thus, be selected by the controller 100 for subsequent communication with the wireless power electronic module 25b. In this example, the direct determined communication path may have a higher signal quality than the cooperative communication path. However, there may, for example, appear, at some point in time, an obstacle (such as an operator or a piece of equipment) in the converter hall 50, between the wireless networking device 20 and the wireless power electronic module 25b which reduces the signal quality of the direct communication path. In such an event, the controller 100 may be configured to switch to the other determined communication path (based on cooperative communication) to communicate with the wireless power electronic module 25b.

It will therefore be appreciated that the method for establishing the communication system in the power converter station may be performed at installation of the devices (including the wireless communication devices, the networking device(s) and the power devices) of the power converter station or at a later stage after installation. The method may also be performed at regular time intervals or upon detection of the installation of a new device or any other change in the power converter station.

Although only some first channels 31 and some second channels 32 are represented in FIG. 1, the controller may obtain indications of signal quality for a plurality of first channels and second channels. FIG. 1 shows for example a first channel 34 between the networking device 20 and the wireless power electronic module 25c which does not have signal quality above the threshold, which is indicated by the first channel 34 being drawn with a dashed line. The controller may then obtain an indication of the signal quality for the first channel 34, i.e. a potential direct communication, between the networking device 20 and the wireless power electronic module 25*c*. However, as such a direct communication appears to be impaired by an element of the power converter station, the signal quality of such a first channel will not be sufficient to qualify as part of a communication path from the controller 100 to the wireless power electronic module 25*c*.

Similarly, although the wireless communication device 15*r* acting as a relay and the wireless power electronic module 25*b* may theoretically form a second channel, communication between these two devices appear to be severely impaired or blocked by a wall or the like of the power converter station. An indication of low signal quality (or an indication of the absence of such a second channel) may therefore be obtained by the controller 100.

Further, it is to be understood that there may be a plurality of second channels 32 which may be used to provide a communication path with a signal quality above the threshold. For example, FIG. 1 represent a second channel 32 between the relay 15*r* and the wireless power electronic module 25*c* and another second channel 32 between the wireless electronic module 25*c* and the wireless power electronic module 25*b*. Assuming that these two second channels provide a relatively high signal quality, FIG. 1 shows two possible communication paths between the controller 100 and the wireless power electronic module 25*c* that provide a signal quality above the threshold.

A first communication path involves the wireless power electronic module 25*b* acting as a relay between the wireless networking device 20 and the wireless power electronic module 25*c*. In other words, the first communication path includes a first channel 31 between the wireless networking device 20 and the wireless power electronic module 25*b* and the second channel 32 between the wireless power electronic module 25*b* and the wireless power electronic module 25*c*.

A second communication path involves the wireless communication device 15*r* acting only as a relay (not associated with a power device) between the wireless networking device 20 and the wireless power module 25*c*. In other words, the second communication path includes a first channel 31 between the wireless networking device 20 and the wireless communication device 15*r* not being associated with any power device and the second channel 32 between the wireless communication device 15*r* and the wireless power electronic module 25*c*.

Figure 2:
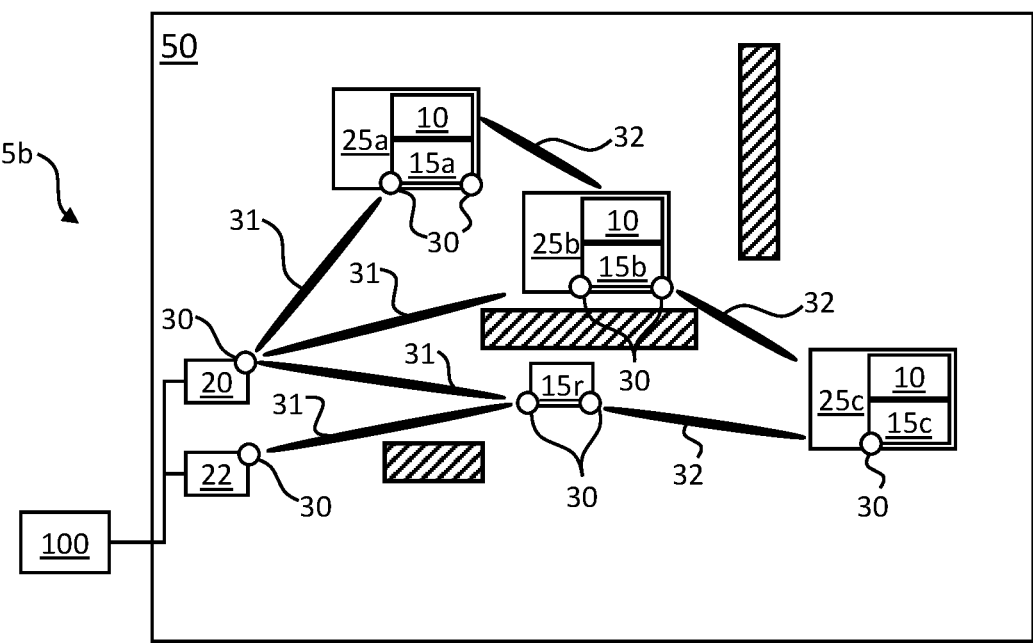

FIG. 2 is a schematic view of a power converter station 5*b* according to one or more exemplifying embodiments. The power converter station shown in FIG. 2 comprises features, elements and/or functions as shown in FIG. 1 and described in the associated text. Hence, it is also referred to FIG. 1 and its associated description for an increased understanding. A difference between the converter stations 5*a* and 5*b* shown in FIG. 1 and FIG. 2 is that the converter station 5*b* in FIG. 2 includes an additional wireless networking device 22. The additional wireless networking device 22 is also coupled to the controller 100.

FIG. 2 illustrates four first channels 31. Two of the first channels 31 are established between the wireless networking device 20 and two of the wireless power electronic modules 25*a*, 25*b*, respectively. Two other of the four first channels 31 are between each of the wireless networking devices 20, 22 and the wireless communication device 15 acting as a relay. Thereby, FIG. 2 shows one respective direct communication path to each one of the wireless power electronic modules 25*a*, 25*b* via a respective first channel 31.

FIG. 2 illustrates also three indirect communication paths to the third wireless power electronic module 25*c*. One of the three indirect communication paths includes communication between the wireless networking device 20 and the third wireless power electronic module 25*c*, with one of the other wireless power electronic device modules 25*b* acting as a relay. The other two indirect communication paths involve communication via the relay 15*r* between the third wireless power electronic module 25*c* and each one of the two wireless networking devices 20, 22, respectively. Hence, all of the indirect communications paths include a first channel 31 and a second channel 32.

Figure 3:
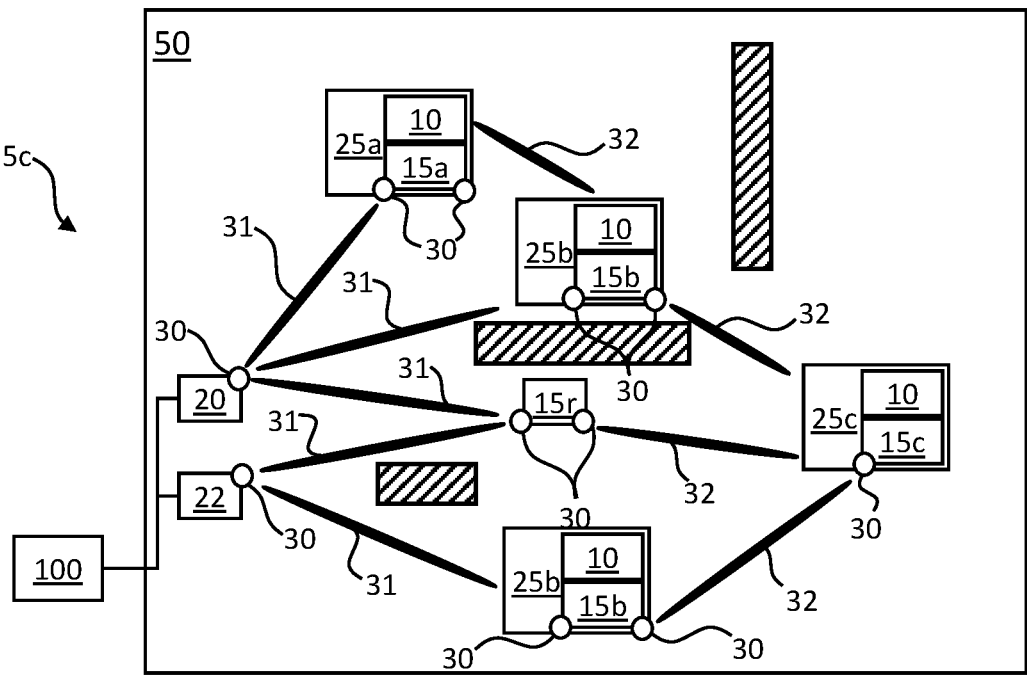

FIG. 3 is a schematic view of a converter station 5*c* according to one or more exemplifying embodiments. The power converter station 5*c* shown in FIG. 3 comprises features, elements and/or functions as shown in FIGS. 2 and 3 and described in the associated texts. Hence, it is also referred to those figures and associated texts for an increased understanding. A difference between the converter stations 5*b* shown in FIG. 2 and FIG. 3 is that the converter station 5*c* shown in FIG. 3 comprises a fourth wireless power electronic module 25*d*. The fourth wireless power electronic module 25*d* is coupled to one of the wireless networking devices 20 via a wire 33. The fourth wireless power electronic module 25*d* may be configured to act as a relay via its wireless communication device 15*d* for one of the preferred (or determined) communication paths from the controller 100 to the wireless power electronic device 25*c*. FIG. 3 shows a second channel 32 between the third wireless power electronic module 25*c* and the fourth wireless power electronic module 25*d*.

Figure 4:
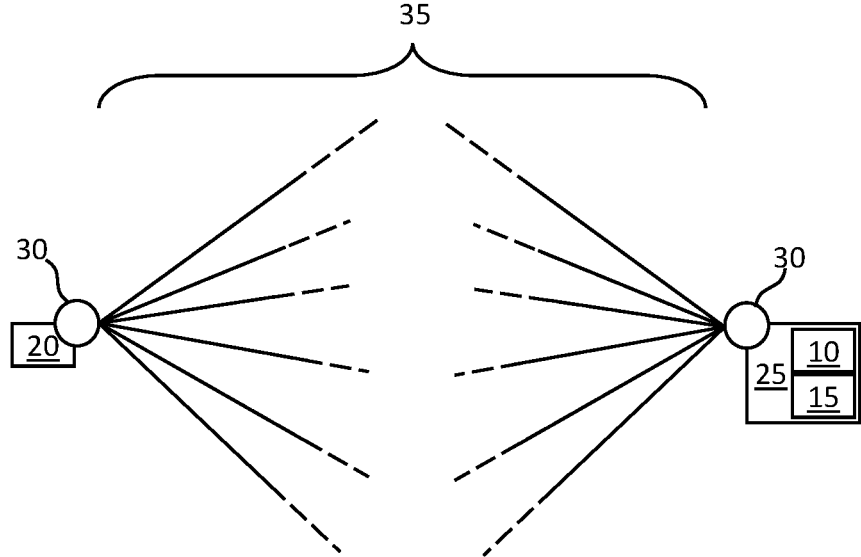
FIG. 4 is a schematic view of first channels between a wireless networking device and a wireless power electronic module according to one or more exemplifying embodiments.

FIG. 4 is a schematic view illustrating a plurality of first channels between a wireless networking device 20 and a wireless power electronic module 25 according to one or more exemplifying embodiments. Each of the wireless networking device 20 and the wireless power electronic module 25 includes an antenna element 30 for directing their respective radio beams 35. A radio beam direction 35 is established by a setting of the antenna elements 30 of the wireless networking device 20 and the wireless power electronic module 25. FIG. 4 shows each antenna element 30 being directed in six radio beam directions 35. Each radio beam direction is indicated as a partly dashed line radiating out from a respective antenna element 30. It is to be understood that there may be any number of radio beam directions 35, and the number of six is an example. Further, the radio beams may continue to propagate along the radio beam directions 35, which is indicated in FIG. 4 by the dashed portions at distal ends of the lines extending out from the antenna elements. In other examples, the wireless networking device 20 shown in FIG. 4 may be replaced by a wireless communication device 15 or a wireless power electronic module 25 for obtaining information about the signal quality of a plurality of second channels established between these two entities by using different beam directions. The wireless power electronic module 25 shown in FIG. 4 may alternatively be replaced with a wireless communication device 15.

Figure 5:
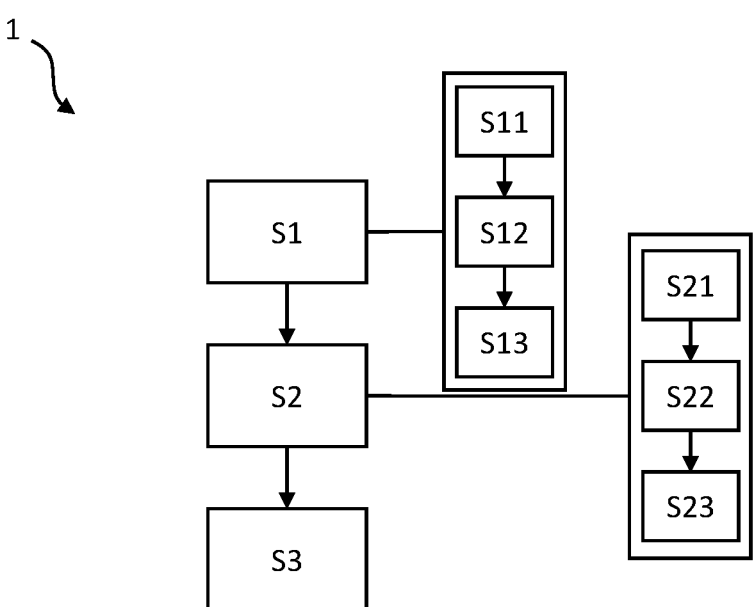
FIG. 5 is a flow chart of a method for establishing a wireless communication system according to one or more exemplifying embodiments.

FIG. 5 is a flow chart of a method 1 for establishing a wireless communication system in a power converter station according to one or more exemplifying embodiments. The power converter station may be a power converter station 5 in accordance with the exemplary embodiments as shown in FIGS. 1 to 3, or a combination thereof. Further, the controller 100 associated with such a power converter station 5 may be configured to operate in accordance with the method 1.

The chart shows the step of obtaining S1 an indication of signal quality for each one of a plurality of first channels 31.

The step of obtaining S1 an indication of signal quality may be performed for every first channel 31. The step of obtaining S1 an indication of signal quality for a first channel 31 of the plurality of first channels 31 may include:

transmitting S11 a first sounding message from the wireless networking device 20 to a wireless communication device 15, receiving S12, at the wireless networking device 20, a message from the wireless communication device 15 in response to the first sounding message, and transmitting S13, from the wireless networking device 20 to the controller 100, information about signal quality of the first channel 31 based on the message received in response to the first sounding message.

An exemplary communication system in a converter station 5 may include a plurality of N wireless networking devices 20, a plurality of M wireless communicating devices 15, wherein a number K of wireless communicating devices 15 form a wireless power electronic module 25 together with a respective power device 10, and wherein each of the N wireless networking devices 20 and each of the M wireless communicating devices 15 can communicate using a number D of radio beam directions 35. The plurality of (M-K) wireless communicating devices 15 not associated with a power device may act only as relays 15. As described in the above, the K wireless communication devices may also act as relays but they are also associated with a power device of the power converter station.

The exemplary communication system, as described above, would in order to obtain an indication of signal quality for each first channel 31 transmit N*M*D first sounding messages: a first sounding message is transmitted from each of the N number of wireless networking devices 20 to each of the M number of wireless communication devices 15 using each of a plurality of D radio beam directions.

The chart of FIG. 5 shows the step of obtaining S2 an indication of signal quality for each one of a plurality of second channels 32. The step of obtaining S2 an indication of signal quality may be performed for every second channel 32. The step of obtaining S2 an indication of signal quality for each one of a plurality of second channels 32 may include:

forwarding S21, from the wireless communication device 15 to the wireless power electronic module 25, a second sounding message received at the wireless communication device 15 from the wireless networking device 20, receiving S22, at the communication device 15, a message from the wireless power electronic module 25 in response to the second sounding message, and transmitting S23, from the wireless communication device 15 to the controller 100 via the wireless networking device 20, information about signal quality of the second channel 32 based on the message received in response to the second sounding message.

The exemplary communication system, as described above, would in order to obtain an indication of signal quality for each second channel 32 forward (M-K)*K*D second sounding messages from relays 15 to wireless power electronic modules 25: a second sounding message is forwarded from each of the (M-K) number of relays 15 to each of the K number of power electronic modules 25 using each of the D number radio beam directions 35.

Further, the exemplary communication system, as described above, would in order to obtain an indication of signal quality for each second channel 32 forward K*(K-

1)/2*D second sounding messages between the wireless power electronic modules 25: a second sounding message is forwarded from each of the K number of power electronic modules 25 to each of the (K-1) number of other power electronic modules 25 each of D number radio beam directions 35.

Hence, the communication system would need to forward ((M-K)*K+(K*(K-1)/2))*D second sounding messages in order to investigate all possible second channels.

However, if all of the wireless communication devices 15 of the exemplary communication system form wireless power electronic device 25 together with a power device 15 (i.e K=M), then the system forwards M*(M-1)/2*D second sounding messages.

Transmitting and forwarding of sounding messages may be performed automatically. In other words, transmitting and forwarding of sounding messages may be performed without manual efforts. Each sounding message takes a relatively short period of time. For example, a sounding message may take about 1 ms. If N=10, M=100, D=50, and K=M, then the time required for performing the steps S1 and S2 of method 1 would be approximately 10 minutes. These values are only provided as an example to illustrate the benefit of the present method.

The configuration of the communication system of the power converter station may be considered to follow a two-step process including channel sounding and path selection.

During channel sounding, all possible combinations between the networking devices (or hubs) and the wireless power electronic modules (and relays) are explored. For this purpose, the antenna arrays are assumed to be adapted to steer their radio beams as mentioned above. In this first part of the procedure, a first wireless networking device (or hub) sends a message to a first wireless communication device for each of the plurality of possible beam directions. The first wireless communication device replies for each beam direction (if the message in the corresponding direction is received). The first wireless networking device records the received signal quality from the first wireless communication device for each direction (a very low level of signal quality is used in case no message is received). The information or indication about signal quality for this first subset of first channels is the transmitted to the controller. The procedure is then repeated for each one of the other wireless communication devices and then repeated again for each one of the networking devices.

Following this first part of the procedure or concurrently with this first part of the procedure, the wireless networking device sends another message (different from the first message) to the first wireless communication device. If the first wireless communication device has two antenna arrays, it may use the second antenna array to forward the message to each one of the other wireless communication devices using each one of the possible beam directions. Each wireless communication devices replies for each direction (if the message in the corresponding direction is received). The first wireless communication device records the received signal quality from each other wireless communication device for each direction (a very low number is used in case no message is received) and sends this information back to the wireless networking device (using the best direction achieved in the first part of the procedure described above), which sends it to the controller. This second part of the procedure is repeated for every wireless communication device.

At the end of these two parts of the channel sounding, the controller has information about all possible combinations for establishing communication paths to each one of the wireless power electronic modules. The controller may then use the information collected in the channel sounding phase for the path selection. The controller may determine communication paths as described in the preceding embodiments, either by direct communication between a networking device and a wireless power electronic module or by cooperative communication involving a communication device (or another wireless power electronic module) acting as a relay.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for establishing a wireless communication system in a high-voltage power converter station including a plurality of power devices, wherein the wireless communication system includes a plurality of wireless communication devices, some of which being associated with a power device such that a power device and a wireless communication device together form a wireless power electronic module, and at least one wireless networking device for providing a communication interface between the plurality of wireless communication devices and a controller configured to control said power devices, the method comprising:
    obtaining, at the controller, an indication of signal quality for each one of a plurality of first channels, wherein a first channel corresponds to a communication path between one of said at least one wireless networking device and a wireless communication device of the plurality of wireless communication devices using one of a plurality of radio beam directions;
    obtaining, at the controller, an indication of signal quality for each one of a plurality of second channels, wherein a second channel corresponds to a communication path between a wireless communication device and a wireless power electronic module of the plurality of wireless power electronic modules using one of a plurality of radio beam directions; and
    determining, by the controller, for every wireless power electronic module, at least one communication path from the controller to the wireless power electronic module based on the indications of signal quality obtained for the plurality of first channels and the plurality of second channels, wherein the determined communication path provides a signal quality above a threshold.

2. The method of claim 1, wherein the controller is configured to communicate with a wireless power electronic module along at least two communication paths providing the two highest signal qualities.

3. The method of claim 1, wherein the controller is configured to prioritize the determined communication paths with respect to signal quality.

4. The method of claim 1, wherein information about the at least one determined communication path is transmitted to said at least one wireless networking device and the wireless communication devices.

5. The method of claim 1, wherein the controller is configured to, during operation, communicate with a wireless power module along a communication path providing the highest signal quality, and to switch, upon determination that said communication path is inactive if a status message is not received from the wireless power module within a predetermined time period, to a communication path providing the second highest signal quality.

6. The method according to claim 1, wherein obtaining an indication of signal quality for a first channel of the plurality of first channels includes:
    transmitting a first sounding message from the wireless networking device to the wireless communication device,
    receiving, at the wireless networking device, a message from the wireless communication device in response to the first sounding message, and
    transmitting, from the wireless networking device to the controller, information about signal quality of the first channel based on the message received in response to the first sounding message.

7. The method of claim 1, wherein obtaining an indication of signal quality for a second channel of the plurality of second channels includes:
    forwarding, from the wireless communication device to the wireless power electronic module, a second sounding message received at the wireless communication device from a wireless networking device of said at least one wireless networking device,
    receiving, at the communication device, a message from the wireless power electronic module in response to the second sounding message, and
    transmitting, from the wireless communication device to the controller via the wireless networking device, information about signal quality of the second channel based on the message received in response to the second sounding message.

8. The method of claim 1, wherein a wireless networking device and a wireless communication device each includes an antenna element for directing their respective radio beams and wherein a radio beam direction is established for obtaining an indication of quality of a first channel by a setting of the antenna element of the wireless networking device and a setting of the antenna element of the wireless communication device.

9. The method of claim 1, wherein each one of the plurality of wireless communication devices includes an antenna element for directing their respective radio beams and wherein a radio beam direction is established for obtaining an indication of quality of a second channel by a setting of the antenna element of the wireless communication device and a setting of the antenna element of the wireless communication device of the wireless power electronic module.

10. The method of claim 8, wherein a radio beam direction is established by beamforming or by manual setting of the respective antenna elements.

11. The method of claim 1, wherein the plurality of first channels includes all communication paths between every one of said at least one wireless networking device and every one of the plurality of wireless communication devices.

12. The method of claim 1, wherein the at least one determined communication path between the controller and a wireless power electronic module includes at least one of (i) a direct communication path between a wireless networking device and said wireless power electronic module and (ii) a communication path including a wireless communication device acting as a relay between a wireless networking device and said wireless power electronic module.

13. The method of claim 1, wherein the controller is configured to determine that a wireless power electronic module is faulty if it is determined that there is no communication path from the controller to said wireless power electronic module that provides a signal quality above the threshold.

14. The method of claim 1, wherein the controller is configured to communicate a respective communication frequency to every wireless networking device and to every wireless power electronic module, and wherein every wireless networking device and every wireless power electronic module is configured to communicate at their respective communication frequency.

15. A high-voltage power converter station comprising:
a plurality of power devices;
a plurality of wireless communication devices, some of which being associated with a power device such that a power device and a wireless communication device together form a wireless power electronic module,
at least one wireless networking device for providing a communication interface between the plurality of wireless communication devices and a controller configured to control said power devices,
wherein the controller is configured to:
obtain an indication of signal quality for each one of a plurality of first channels, wherein a first channel corresponds to a communication path between one of said at least one wireless networking device and a wireless communication device of the plurality of wireless communication devices using one of a plurality of radio beam directions;
obtain an indication of signal quality for each one of a plurality of second channels, wherein a second channel corresponds to a communication path between a wireless communication device and a wireless power electronic module of the plurality of wireless power electronic modules using one of a plurality of radio beam directions; and
determine, for every wireless power electronic module, at least one communication path from the controller to the wireless power electronic module based on the indications of signal quality obtained for the plurality of first channels and the plurality of second channels, wherein the determined communication path provides a signal quality above a threshold.

16. The converter station of claim 15, wherein wireless communication within the power converter station corresponds to communication at frequencies from 3 GHz to 300 GHz or from 0.1 THz to 10 THz.

17. The method of claim 2, wherein the controller is configured to prioritize the determined communication paths with respect to signal quality.

18. The method of claim 2, wherein information about the at least one determined communication path is transmitted to said at least one wireless networking device and the wireless communication devices.

19. The method of claim 3, wherein information about the at least one determined communication path is transmitted to said at least one wireless networking device and the wireless communication devices.

20. The method of claim 1, wherein wireless communication within the power converter station corresponds to communication at frequencies from 3 GHz to 300 GHz or from 0.1 THz to 10 THz.

* * * * *